UNITED STATES PATENT OFFICE.

GEORGE T. BALL, OF FOSS, OKLAHOMA.

TANNING COMPOUND.

1,210,259.  Specification of Letters Patent.  Patented Dec. 26, 1916.

No Drawing. Application filed April 6, 1914, Serial No. 829,999. Renewed May 26, 1916. Serial No. 100,157.

*To all whom it may concern:*

Be it known that I, GEORGE T. BALL, a citizen of the United States, residing at Foss, in the county of Washita and State of Oklahoma, have invented new and useful Improvements in Tanning Compounds, of which the following is a specification.

The invention relates to an improvement in tanning compounds, and is particularly directed to a mixture of simple ingredients, resulting in the production of a particularly effective tanning compound.

The improved tanning compound is made up of a plant known as August flower or bitter weed (*Ambrosia artemisiæfolia*) gum gambier and lauber's salt. In the preferred proportion and manner of mixing these ingredients, I boil six pounds of August flower in ten gallons of soft water for approximately one and one half hours. Six pounds of gum gambier is then added to the solution and same is steeped until the gum is thoroughly dissolved. Five gallons of cold water is then added and the solution strained, after which two pounds of Glauber's salt is added.

The solution is effective for tanning any and all kinds of hides either with the hair on or with the hair off, experiment having proven that calf and goat hides will readily tan in the solution from thirty-six to forty-eight hours, and the heaviest sole leather effectively tanned in from ten to fifteen days.

What is claimed is:—

1. A tanning solution consisting of August flower, gum gambier, and Glauber's salt.

2. A tanning solution including a solution of six pounds of August flower in ten gallons of water, with the addition of six pounds of gum gambier, the subsequent addition of five gallons of water, and the subsequent addition of two pounds of Glauber's salt.

In testimony whereof I affix my signature in presence of two witnesses.

GEORGE T. BALL.

Witnesses:
 JOHN F. ADEN,
 WILLIAM YOUNG.